United States Patent
Hirschmann et al.

(10) Patent No.: US 11,834,012 B2
(45) Date of Patent: Dec. 5, 2023

(54) APPARATUS AND METHOD FOR CLEANING A VEHICLE HAVING AT LEAST ONE OUTER SURFACE WHICH IS INCLINED BY AN INCLINATION ANGLE WITH RESPECT TO THE VERTICAL

(71) Applicant: Washtec Holding GmbH, Augsburg (DE)

(72) Inventors: Ruediger Hirschmann, Augsburg (DE); Sven Arndt, Augsburg (DE); Florian Endress, Augsburg (DE); Oliver Foerg, Augsburg (DE)

(73) Assignee: Washtec Holding GmbH, Augsburg (DE)

( * ) Notice: Subject to any disclaimer, the term of this patent is extended or adjusted under 35 U.S.C. 154(b) by 244 days.

(21) Appl. No.: 16/746,857

(22) Filed: Jan. 18, 2020

(65) Prior Publication Data
US 2020/0148176 A1    May 14, 2020

Related U.S. Application Data

(63) Continuation of application No. PCT/EP2018/069527, filed on Jul. 18, 2018.

(30) Foreign Application Priority Data

Jul. 18, 2017   (DE) ..................... 10 2017 116 174.0

(51) Int. Cl.
  *G01B 7/30*    (2006.01)
  *B60S 3/06*    (2006.01)
  *G01D 5/12*    (2006.01)
(52) U.S. Cl.
  CPC ............... *B60S 3/063* (2013.01); *G01B 7/30* (2013.01); *G01D 5/12* (2013.01)

(58) Field of Classification Search
  CPC . B60S 3/06; B60S 3/063; B60S 3/008; G01B 7/30; G01B 7/305; G01B 7/31;
  (Continued)

(56) References Cited

U.S. PATENT DOCUMENTS 3,942,207 A   3/1976   Weigele et al.
4,320,551 A   3/1982   Roncaglione
(Continued)

FOREIGN PATENT DOCUMENTS

CN    101767574 A    7/2010
CN    203172596 U    9/2013
(Continued)

OTHER PUBLICATIONS

Office Action issued in German Patent Application No. DE 10 2017 116 174.0, dated Jun. 22, 2018 (from which this application claims priority) and English language translation thereof.
(Continued)

*Primary Examiner* — Son T Le
(74) *Attorney, Agent, or Firm* — Ewers IP Law PLLC; Falk Ewers

(57) ABSTRACT

An apparatus for cleaning a vehicle having at least one outer surface which is inclined by an inclination angle with respect to the vertical, includes a device for detecting the inclination angle of the at least one outer surface, a cleaning brush which can be passed along the at least one outer surface, a device for setting an inclination angle of the cleaning brush with respect to the vertical corresponding to the inclination angle of the at least one outer surface, a device 20 for monitoring the inclination angle of the cleaning brush, and a device for regulating the inclination angle of the cleaning brush for adjusting to the inclination angle of the at least one outer surface. A method for cleaning a vehicle having at least one outer surface which is inclined by (Continued)

an inclination angle with respect to the vertical is also provided.

7 Claims, 4 Drawing Sheets

(58) Field of Classification Search
CPC . G01B 3/56; G01B 5/24; G01B 5/245; G01B 9/10; G01B 11/26; G01B 11/27; G01B 13/18; G01B 13/19; G01D 5/12
See application file for complete search history.

(56) References Cited

U.S. PATENT DOCUMENTS

| 5,715,558 | A | 2/1998 | Johnson |
| 10,994,705 | B2 | 5/2021 | Auer et al. |
| 2017/0297538 | A1 | 10/2017 | Auer et al. |
| 2018/0156582 | A1 | 6/2018 | Hartl et al. |

FOREIGN PATENT DOCUMENTS

| CN | 206067722 U | 4/2017 | |
| CN | 106794824 A | 5/2017 | |
| DE | 1936889 A1 | 1/1971 | |
| DE | 4428146 A1 | 2/1995 | |
| DE | 202010017777 U1 | 11/2012 | |
| DE | 102014112388 A1 | 3/2016 | |
| GB | 2110176 A | 6/1983 | |
| JP | 03079455 A | 4/1991 | |
| JP | 05213163 A | 8/1993 | |
| JP | 2006142879 A | 6/2006 | |
| JP | 2006224828 A | 8/2006 | |
| JP | 2006224828 A | * 8/2006 | |
| JP | 2007153140 A | 6/2007 | |
| JP | 2007153140 A | * 6/2007 | |
| JP | 2008105476 A | 5/2008 | |
| JP | 2012096598 A | 5/2012 | |
| JP | 2012096598 A | * 5/2012 | |
| JP | 2012096730 A | 5/2012 | |
| WO | 2016030218 A1 | 3/2016 | |

OTHER PUBLICATIONS

International Search Report of the European Patent Office in PCT/EP2018/069527 (from which this application claims priority) dated Oct. 22, 2018 and English-language translation thereof.
Written Opinion of the European Patent Office dated Apr. 19, 2021 of European counterpart application No. EP18746643.8. and English machine translation thereof.
Office Action dated Feb. 11, 2023 issued in Chinese counterpart application No. 201880059500.9 and English-language translation thereof.
Chinese Search Report of Chinese counterpart application No. 201880059500.9 from the Chinese National Intellectual Property Administration dated Sep. 22, 2022 and English-language translation thereof.
Office Action dated Sep. 22, 2022 issued in Chinese counterpart application No. 2018800595009 and English- language translation.

* cited by examiner

APPARATUS AND METHOD FOR CLEANING A VEHICLE HAVING AT LEAST ONE OUTER SURFACE WHICH IS INCLINED BY AN INCLINATION ANGLE WITH RESPECT TO THE VERTICAL

CROSS REFERENCE TO RELATED APPLICATIONS

This application is a continuation application of international patent application PCT/EP2018/069527, filed Jul. 18, 2018, designating the United States and claiming priority to German application 10 2017 116 174.0, filed Jul. 18, 2017, and the entire content of both applications is incorporated herein by reference.

TECHNICAL FIELD

The present disclosure relates to an apparatus and a method for cleaning a vehicle having at least one outer surface which is inclined by an inclination angle with respect to the vertical.

BACKGROUND

In vehicle washing installations such as portal washing installations or washing tunnels, the surfaces of the vehicle are typically cleaned using rotatable washing brushes. In particular, the side and rear surfaces of the vehicle can have inclinations and curves which often cannot be cleaned sufficiently using the washing brushes of conventional washing installations. Most especially in the transition region from a sloping side surface to a sloping rear surface the result of the cleaning process can be unsatisfactory.

From DE102104112388 A1 and WO2016030218 A1, a vehicle washing installation is known in which, in order to clean a side surface and an adjoining rear surface of the vehicle, at least one side washing brush is used which can be brought from a vertical basic position into inclined positions.

From DE 1936889 A1 and U.S. Pat. No. 5,715,558 A, side brushes are known which are suspended freely at the upper end of their axis of rotation and can subject the vehicle to their weight and swing in an undesirable manner during the cleaning process.

SUMMARY

It is an object of the disclosure to provide an apparatus and a method for cleaning a vehicle, which permit a thorough cleaning result even in the transition region between two outer surfaces and for different and varying inclinations of the outer surfaces, as well as a high level of operation safety and the avoidance of vehicle damage.

The object is achieved by an apparatus and a method for cleaning a vehicle as described herein.

According to a first exemplary embodiment of the disclosure, the apparatus for cleaning a vehicle having at least one outer surface which is inclined by an inclination angle with respect to the vertical includes a device for detecting the inclination angle of the at least one outer surface, a cleaning brush which can be passed along the at least one outer surface, a device for setting the inclination angle of the cleaning brush with respect to the vertical corresponding to the inclination angle of the at least one outer surface, a device for monitoring the inclination angle of the cleaning brush during a cleaning process; and a device for regulating the inclination angle of the cleaning brush during the cleaning process for adjusting to the inclination angle of the at least one outer surface. The device for monitoring the inclination angle of the cleaning brush includes an angle sensor which includes a magnet and a magnetic field sensor. The angle sensor is arranged at least partially on an inclination axis corresponding to the inclination angle of the cleaning brush, and the magnet is arranged on the inclination axis remote from the magnetic field sensor. The angle sensor is formed such that during monitoring of the inclination angle of the cleaning brush a change in an orientation of a magnetic field of the magnet is detected. The apparatus can include more than one cleaning brush.

The apparatus according to the above-mentioned exemplary embodiment permits monitoring and regulation of the inclination angle of the cleaning brush during the cleaning process. In particular, the monitored inclination angle of the cleaning brush is regulated for adjusting to the inclination angle of the at least one outer surface. By the monitoring of the inclination angle of the cleaning brush it is possible at any time during the cleaning process to detect a current actual value of the inclination angle of the brush which is compared, during regulation of the inclination angle of the brush, with the detected inclination angle(s) of the at least one outer surface as a desired value. Therefore, the apparatus permits guidance of the cleaning brush which is adapted to the entire outer contour of the vehicle, i.e., even at the transition region from the side surfaces to the rear surface and to different and varying inclinations of the side and/or rear surfaces. This results in particularly thorough cleaning of the vehicle. At the same time, reliable approach of the brush to the surface of the vehicle can be maintained by the apparatus during the cleaning process. In addition, using the apparatus makes it possible to avoid undesirable swinging of the brush in that even small deviations from the desired inclination angle of the brush are detected and the inclination angle is re-regulated. Undesirable swinging of the brush which may still occur can also be sensed and a corresponding safety stop of the apparatus can be triggered. Therefore, the operation safety of the vehicle washing installation is increased and vehicle damage is avoided.

According to a further exemplary embodiment, the inclination angle of the at least one outer surface with respect to the vertical can be in a range of −20° to 90°. The settable inclination angle of the cleaning brush can thus likewise be in a range of −20° to 90° with respect to the vertical. Therefore, not only can the inclination angle of the side brushes be monitored and regulated in adaptation to the contour of the vehicle, but also the inclination angles of other brushes of the apparatus for cleaning a vehicle, e.g., a roof brush or rear brush. Typically, the inclination angle of the at least one outer surface and/or of the cleaning brush can be in the range of −10° to 50°, more typically in the range of −5° to 15°.

In a further exemplary embodiment, the device for monitoring the inclination angle of the cleaning brush can include an angle sensor or be formed as an angle sensor. This has the advantage that the inclination of the cleaning brush with respect to the vertical can be monitored intermittently or continually during the cleaning process.

The angle sensor can be arranged at least partially on an inclination axis corresponding to the inclination angle of the cleaning brush, e.g., on an inclination axis setting the inclination angle. Therefore, the inclination of the brush can be detected precisely. In particular, the inclination axis can correspond to a pivot axis of the brush, by which the inclination angle of the brush is set.

Furthermore, the angle sensor can include a magnet and a magnetic field sensor. This has the advantage that the function of the angle sensor is not temperature-dependent and moisture-dependent, is insensitive to shaking, and also cannot be influenced by water pressure.

According to other exemplary embodiments, the magnet can be arranged on the inclination axis remote from the magnetic field sensor. The detection of the inclination angle of the cleaning brush can thus be continuous with a particularly high level of precision.

In one exemplary embodiment, the cleaning brush can be applied to the outer surface with a contact pressure, and the apparatus can further include: a device for monitoring the contact pressure; and a device for regulating the contact pressure of the cleaning brush onto the outer surface, in particular for regulating the monitored contact pressure. Therefore, the apparatus permits an abrupt and/or undesired change in the contact pressure of the brush to be detected and this to be counteracted by re-regulating the contact pressure and/or the inclination angle of the brush. Thus, the regulation of the inclination angle of the cleaning brush can be supported and optimised for adjusting to the inclination angle of the vehicle outer surface, in order to achieve the desired cleaning result and to increase the operation safety of the apparatus.

A further exemplary embodiment of the disclosure relates to a method for cleaning a vehicle having at least one outer surface which is inclined by an inclination angle with respect to the vertical. The method includes:

(a) detecting the inclination angle of the at least one outer surface, (b) setting the inclination angle of a cleaning brush with respect to the vertical corresponding to the inclination angle of the at least one outer surface, (c) passing the cleaning brush along the at least one outer surface during a cleaning process, (d) monitoring the inclination angle of the cleaning brush during step (c), (e) regulating the inclination angle of the cleaning brush during step (c) for adjusting to the inclination angle of the at least one outer surface, carrying out step (d) with an angle sensor which includes a magnet and a magnetic field sensor, arranging the angle sensor at least partially on an inclination axis corresponding to the inclination angle of the cleaning brush, arranging the magnet on the inclination axis remote from the magnetic field sensor, and detecting, in step (d), a change in an orientation of a magnetic field of the magnet.

The method can be carried out using an apparatus according to any one of the preceding exemplary embodiments and provides the same advantages. The method can be carried out with more than one cleaning brush. Thus, in step a) the inclination angles of more than one outer surface can be detected. Furthermore, in steps b) to e) more than one cleaning brush can be used.

In a further exemplary embodiment of the method, the inclination angle of the at least one outer surface with respect to the vertical can be in a range of −20° to 90°. Furthermore, step d) of the method can be carried out using an angle sensor or with an angle sensor. The angle sensor can be arranged at least partially on an inclination axis corresponding to the inclination angle of the cleaning brush, e.g., on an inclination axis setting the inclination angle. Furthermore, in the method of the exemplary embodiments, the angle sensor can include a magnet and a magnetic field sensor. Thus, in step d) of the method, a change in the orientation of the magnetic field of the magnet can be detected. Furthermore, the magnet can be arranged on the inclination axis remote from the magnetic field sensor. The method can, in further exemplary embodiments, include applying the cleaning brush to the outer surface with a contact pressure, monitoring the contact pressure, and regulating the contact pressure of the cleaning brush onto the outer surface, in particular the monitored contact pressure.

The above-mentioned exemplary embodiments of the method can include corresponding modifications as in the above-described embodiments of the apparatus for cleaning a vehicle and render possible the same advantageous effects as the above-described exemplary embodiments of the apparatus with corresponding features.

In another exemplary embodiment of the method, at least one first outer surface and one at least one second outer surface can be cleaned, these surfaces adjoining one another and being inclined by the same or a different inclination angle with respect to the vertical, wherein, in step a) the inclination angles of the first and of the second outer surface are detected, steps b) to e) are carried out for the first outer surface, and then steps b) to e) are carried out for the second outer surface. In this way, the transition region between the first and second outer surfaces of the vehicle, e.g., between the side surface and the rear surface, can be thoroughly cleaned.

BRIEF DESCRIPTION OF THE DRAWINGS

The disclosure will now be described with reference to the drawings wherein.

DESCRIPTION OF EXEMPLARY EMBODIMENTS

In the following detailed description of the figures, exemplary embodiments, which are to be understood to be non-limiting, together with the features and further advantages thereof will be explained with the aid of the figures.

Figure 1:
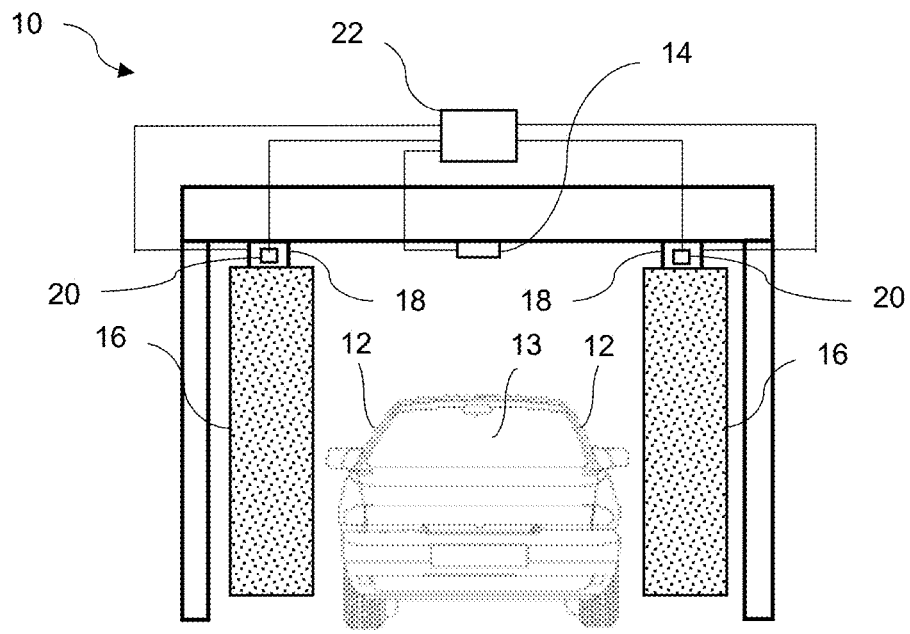
FIG. 1 schematically shows an apparatus after the vehicle has driven in according to an exemplary embodiment of the disclosure.

FIG. 1 shows an exemplary embodiment in accordance with the disclosure of the apparatus 10 for cleaning a vehicle after the vehicle has driven in, using the example of a portal washing installation.

The vehicle has at least one outer surface 12 and 13, wherein, in FIG. 1, two side surfaces 12 and a rear surface 13 are shown, which are each inclined by an inclination angle with respect to the vertical.

In the apparatus 10, a frame with a cross-piece is provided, on which two side brushes 16 are arranged, each via a suspension element 18 and each configured to rotate about a central, longitudinally extending axis of rotation of the brush. The brush body or the bristles of the side brushes can be made, e.g., of polyethylene (PE) foam, PE, or polypropylene (PP) felt. As shown in FIG. 1, the side brushes are attached to the respective suspension element at the upper end of their respective axis of rotation. Prior to the apparatus coming into operation, the side brushes 16 and their axes of rotation are orientated vertically as shown in FIG. 1. The side brushes 16 can each travel by the cross-piece substantially parallel to, and along, the side surfaces 12 and, with a carriage provided on the cross-piece, substantially parallel to and along the rear surface 13.

The suspension elements 18 each include (not shown) a brush holder and a rotary drive, with which the associated side brush can be caused to rotate about its central axis of rotation. The suspension elements 18 are each provided with two actuating drives (not shown), e.g., linear drives with pneumatic or hydraulic cylinders, which can pivot the central axis of rotation of the respective side brush about a pivot axis (not shown) substantially parallel to the side surface of the vehicle and about a pivot axis (not shown) substantially parallel to the rear surface of the vehicle. Further exemplified details of the suspension element 18 can be found in DE102104112388 A1.

The apparatus 10 further includes a device 14 for detecting the inclination angles of the outer surfaces 12 and/or 13. The device 14 can include an image detection apparatus, a roof brush or side brush or roof drier travelling over the contour of the vehicle, light barriers or light grids, radar sensors or ultrasonic sensors, an input apparatus, a database, and/or a vehicle type recognition means. For example, a database can be provided from which, after determination or input of the vehicle type, the inclination angle of the outer surfaces 12 and 13 can be detected. Alternatively or additionally, the device 14 can serve to detect the contour of the vehicle, which detection can take place using the apparatus of the present example at the beginning of the method for cleaning the vehicle. For example, the 3D contour or vertical contour of the vehicle can be detected and from this the inclination angles can be determined or derived. In the exemplary embodiment, the device 14 includes a camera. FIG. 1 illustrates the device 14 schematically, arranged centrally on the cross-piece of the apparatus.

The apparatus 10 further includes a device 18 for setting the inclination angles of the side brushes with respect to the vertical, corresponding to the inclination angles of the outer surfaces 12 and/or 13. In the exemplary embodiment, the device 18 is embodied by the above-described suspension element 18 and the actuating drives, with which the brush axis of rotation can be pivoted parallel to the rear surface 13 and/or parallel to the side surfaces 12 of the vehicle.

The apparatus 10 further includes a device 20 for monitoring the inclination angles of the side brushes during the cleaning process. In the exemplary embodiment, the device 20 is configured as an angle sensor which detects the inclination angle of the respective brush or of its axis of rotation with respect to the vertical. At least one angle sensor is provided per side brush. Alternatively, in the case of common control of the side brushes, by which the two side brushes are operated in a substantially mirror-symmetrical manner, at least one angle sensor can be provided only on one side brush.

The apparatus 10 further includes a data-processing controller 22 is connected via data-carrying connections to the device 14 for detecting the inclination angles of the outer surface(s), to the device 18 for setting an inclination angle of the side brushes 16 with respect to the vertical corresponding to the inclination angles of the outer surface(s), and to the device 20 for monitoring the inclination angle of the side brushes, and which data-processing controller controls the method for cleaning the vehicle.

At the same time, by the data-carrying and data-processing networking of the device 14 for detecting the inclination angles of the outer surface(s), of the device 18 for setting the inclination angles of the side brushes with respect to the vertical corresponding to the inclination angles of the outer surface(s), of the device 20 for monitoring the inclination angles of the side brushes and of the controller 22, a device is realized for regulating the monitored inclination angles of the side brushes during the cleaning process for adjusting to the inclination angle(s) of the outer surface(s).

During operation, the method for cleaning a vehicle having at least one outer surface which is inclined by an inclination angle with respect to the vertical is carried out using the apparatus 10.

In one exemplary embodiment, the method includes the following steps:

a) detecting the inclination angle of the side surfaces 12;

b) setting the inclination angles of the side brushes 16 with respect to the vertical substantially corresponding to the inclination angles of the side surfaces 12;

c) passing the side brushes 16 along the side surfaces during the cleaning process;

d) monitoring the inclination angles of the side brushes 16 during step c); and e) regulating the monitored inclination angles of the side brushes 16 during step c) for adjusting to the inclination angles of the side surfaces 12.

Figure 2:
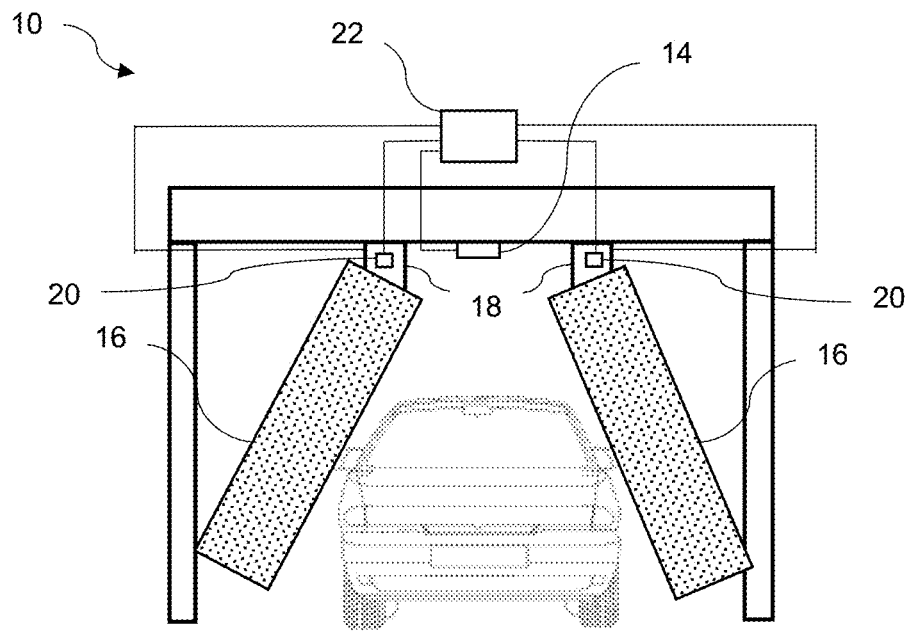
FIG. 2 schematically shows the apparatus shown in FIG. 1 during step b) of the method in accordance with an exemplary embodiment of the disclosure.
Figure 3:
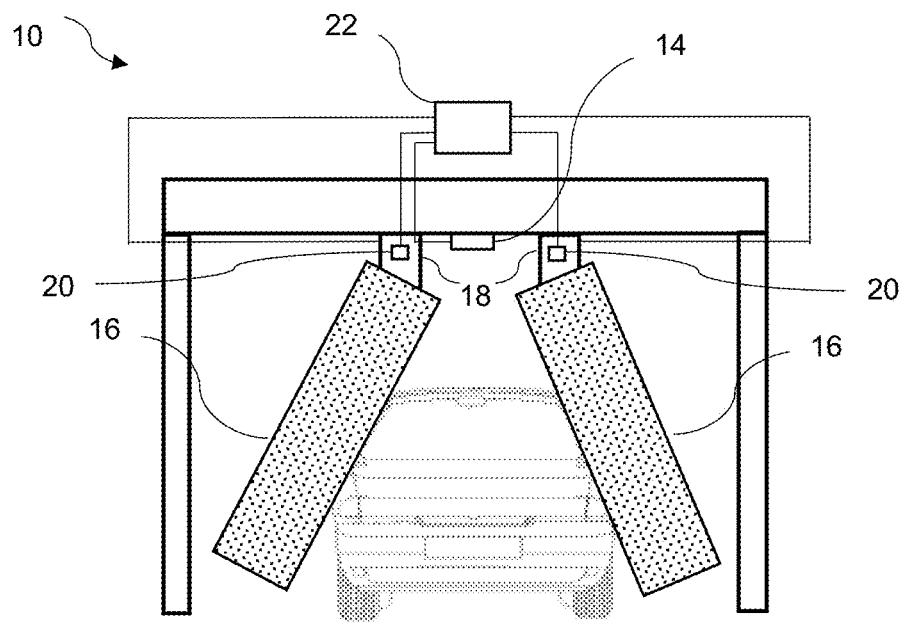
FIG. 3 schematically shows the apparatus shown in FIG. 1 during steps c) and d) of the method in accordance with an exemplary embodiment of the disclosure.
Figure 4:
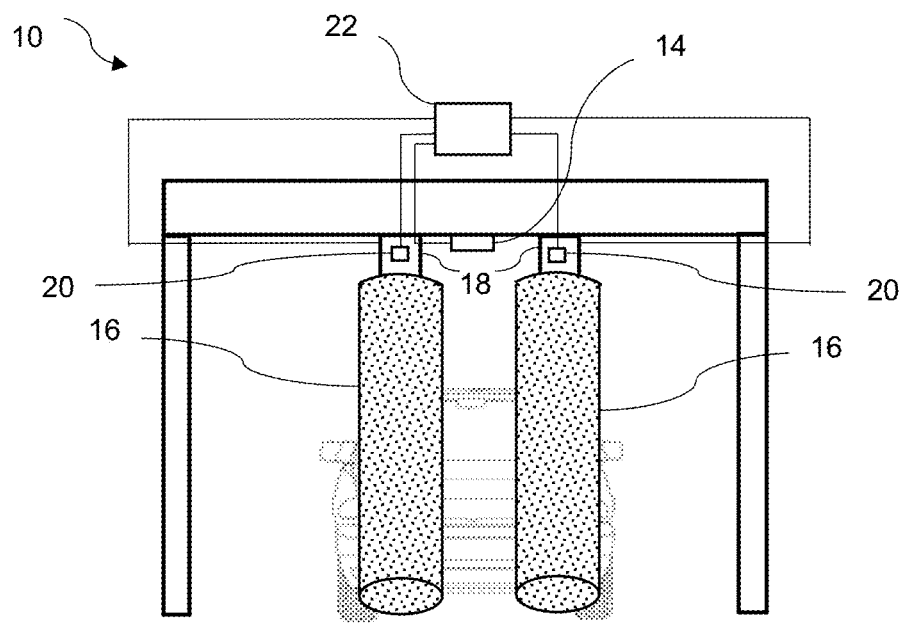
FIG. 4 schematically shows the apparatus of FIG. 1 during steps c) and d) of the method according to an exemplary embodiment of the disclosure.
Figure 5:
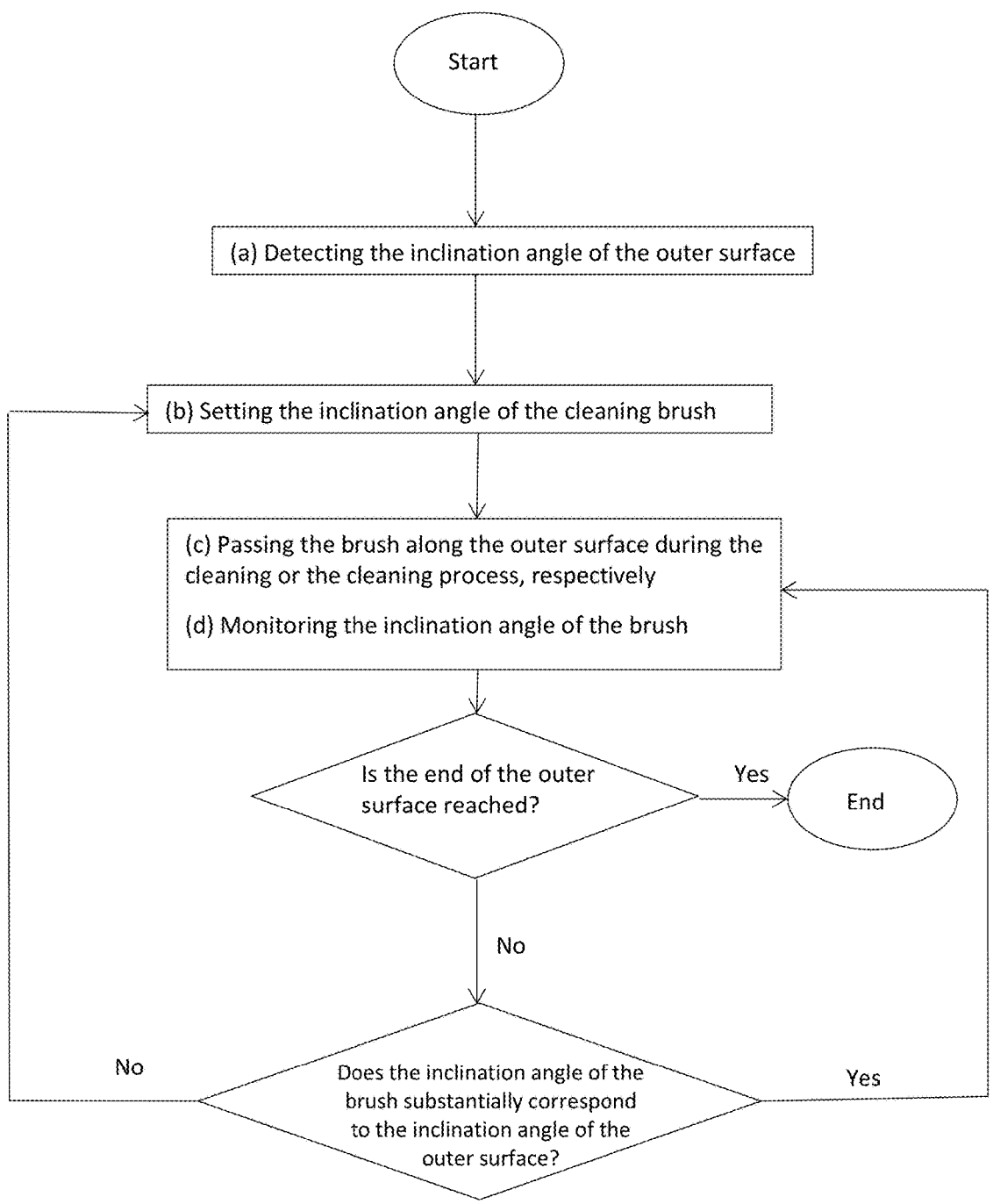
FIG. 5 shows a flowchart of the method according to an exemplary embodiment of the disclosure.

The method according to an exemplary embodiment of the present disclosure is now described with reference to FIGS. 1 to 5. FIG. 1 shows the apparatus 10 after the vehicle has been driven in. FIGS. 2 and 3 show the apparatus 10 during steps b) to d) of the method. FIG. 5 shows a flowchart of the method according to an exemplary embodiment of the disclosure.

First, in step a), the inclination angles of the side surfaces 12 are detected by the camera of the above-described device 14 within the framework of an initial contour detection. For this purpose, the cross-piece with the camera 14 is made to travel over the vehicle over the entire length thereof. In the exemplary embodiment, an inclination angle of the side surfaces of about 10° with respect to the vertical is determined in each case.

Thereafter, the side brushes 16 are caused to rotate about their axis of rotation, as schematically shown in FIG. 1. Then, in step b), the inclination angles of the side brushes 16 are set to about 10° with respect to the vertical, corresponding to the inclination angles of the side surfaces 12, as shown in FIG. 2. The side brushes 16 are then moved towards the side surfaces 12 of the vehicle by displacement of the suspension element 18 along the cross-piece, and in step c), during the cleaning process, are passed along the side surfaces 12 by displacement of the cross-piece substantially parallel to the side surfaces.

During step c), i.e. during the passage of the side brushes 16 along the side surfaces 12, the inclination angles of the side brushes are continually monitored by the device 20 for monitoring the inclination angles of the side brushes, by the angle sensor in the present example. This corresponds to step d) of the method.

As long as the end of the side surfaces 12 is not reached, steps c) and d) are continued and there is continuous detection (step e)) as to whether the inclination angles of the brushes 16 substantially correspond to the inclination angles of 10° of the respective side surfaces 12 with respect to the vertical. In so doing, a tolerance range of ±5°, typically ±3°, more typically ±0.1° can be considered. If the monitored inclination angles of the side brushes substantially correspond to the inclination angles of the respective side surfaces 12 with respect to the vertical, steps c) to e) are repeated until the end of the side surfaces 12 is reached. If the monitored inclination angles of the side brushes do not substantially correspond to the inclination angles of the respective side surfaces 12 with respect to the vertical, step b) is additionally carried out again and the inclination angles of the side brushes are set again, i.e., re-regulated in such a way that they substantially correspond to the inclination angles of the side surfaces.

The method is terminated as soon as the side brushes have reached and cleaned the end of the side surfaces 12.

By the regulation of the monitored inclination angles of the side brushes corresponding to the inclination angles of the side surfaces, it is possible during cleaning, in particular during step c), to maintain a safe penetration depth of the treated vehicle outer surface into the brush body. In this way, the side surfaces are cleaned satisfactorily, while at the same time damage to the side surfaces by the side brushes is avoided.

As explained above, in the exemplary embodiment, the device 20 for monitoring the inclination angle of the side brushes is configured as an angle sensor. The angle sensor includes a magnet and a magnetic field sensor. Since this is a magnetic angle sensor, disturbances in the angle sensor by shaking, temperature fluctuations, moisture or water pressure are minimized. In particular, during monitoring of the inclination angle of the brush, the change in the orientation of the magnetic field is determined. In the exemplary embodiment, the magnet is arranged remote from the magnetic field sensor on the pivot axis of the respective brush. The magnet is thus mounted at a distance from the magnetic field sensor on the pivot axis by which the inclination angle to be monitored is set, and the magnetic field sensor is provided on the suspension element 18 of the brush but not on the pivot axis. Thus, the angle sensor can monitor the inclination angle of the brush substantially continuously and with a particularly high level of precision. In exemplary embodiments with a plurality of pivot axes per brush, an angle sensor can be provided for each pivot axis of the respective brush. It is to be noted that all exemplary embodiments in which an angle sensor is used permit particularly precise sensing and actuating means because the angle sensor is advantageously not a point sensor and also not a sensor operated in an acceleration-based manner.

The exemplary embodiment of the apparatus 10 and of the method carried out thereby is described with reference to a portal washing installation. However, the disclosure is not limited thereto and can be implemented analogously in any embodiment, e.g. including using a washing tunnel. In addition, in one variation of the apparatus 10 and of the method it is possible to provide or use not two but rather only one side washing brush 16 with a corresponding suspension element 18. In alternative exemplary embodiments of the method, the rotation of the side brushes 16 can also be initiated during step b). Furthermore, the side brushes 16 can also move towards the side surfaces 12 prior to step b).

In one modification of the above-described exemplary embodiment, the apparatus 10 and the associated method can also be used to clean the rear surface 13 as illustrated in FIG. 3. In so doing, after the end of the side surfaces 12 has been reached, the side brushes 16 are also used to clean the rear surface 13 and steps a) to e) of the method are carried out analogously for the rear surface 13. For this purpose, after the end of the side surfaces 12 has been reached, the side brushes 16 are oriented substantially vertically and then set corresponding to the inclination angle of the rear surface 13 detected in step a). This is achieved in that by the suspension elements 18 with the corresponding actuating drives, the central axes of rotation of the side brushes 16 are each pivoted about the pivot axis substantially parallel to the side surfaces of the vehicle. The inclined side brushes 16 are then passed along the rear surface 13 as far as the middle in each case. Alternatively, the inclination angle of the side brushes 16 pre-set for the side surfaces 12 can initially be retained, the side brushes 16 can be rotated in the correspondingly modified suspension element 18 about their respective central axes of rotation by about 90° and the pre-set inclination angle of the side brushes can be adapted to the inclination angle of the rear surface 13 in step b) or can be retained in the case of a good correspondence, whereupon steps c) to e) of the method are then carried out for the rear surface. In a further variation, the cleaning of the rear surface 13 can be carried out using only one of the side brushes 16, wherein this is passed along the whole rear surface 13.

As explained above, first the side surfaces and then a rear surface adjoining the same can be cleaned using the side brushes. The side and rear surfaces can have the same or different inclination angles. Alternatively, first a rear surface and then side surfaces adjoining same can be cleaned. In the case of a wide transition region from the side to the rear surface, e.g., with an inclination angle which differs from that of the side and/or rear surfaces, the inclination angle of the transition region also can be detected in step a), and steps b) to e) can also be carried out for the transition region between cleaning the side surfaces and cleaning the rear surface. These exemplary embodiments enable thorough cleaning of the transition region between a first and a second outer surface of the vehicle, e.g., as described above, between the side and rear surface.

In further variations of the above-described exemplary embodiments, the apparatus 10 and the associated method can analogously include or use at least one rear brush for cleaning the rear surface 13. The rear brush can exclusively clean the rear surface 13 in that the inclination angle of the rear brush is set, monitored and regulated corresponding to the detected inclination angle of the rear surface 13 as described above. The rear brush can be provided, e.g., on a further cross-piece of the washing portal separate from the side brushes and can be passed along the rear surface 13 parallel thereto by a carriage arranged on the associated cross-piece.

It will be understood that the suspension element 18 of the respective cleaning brush(es) can be configured differently for the above-described case of cleaning only the side surfaces and cleaning only the rear surface. If only one or two side surfaces are cleaned, in each case one pivot axis and one actuating drive can suffice for brush suspension, with which the central axis of rotation of the brush can be pivoted substantially parallel to the rear surface of the vehicle. In the case of a rear brush which cleans only the rear surface, a pivot axis and an actuating drive can be provided by which the central axis of rotation of the brush can be pivoted substantially parallel to the side surface of the vehicle. Furthermore, in alternative exemplary embodiments of the apparatus and of the method, other suspension elements for the cleaning brushes can be provided. For example, at least one of the cleaning brushes can be suspended in a freely swinging manner at the upper end of the brush axis on a cantilever arm or at the upper and lower end of the brush axis on two cantilever arms. In this case, the inclination angle of the brush can be set via the cantilever arm(s) with support on the respective outer surface of the vehicle to be cleaned.

Figure 6:
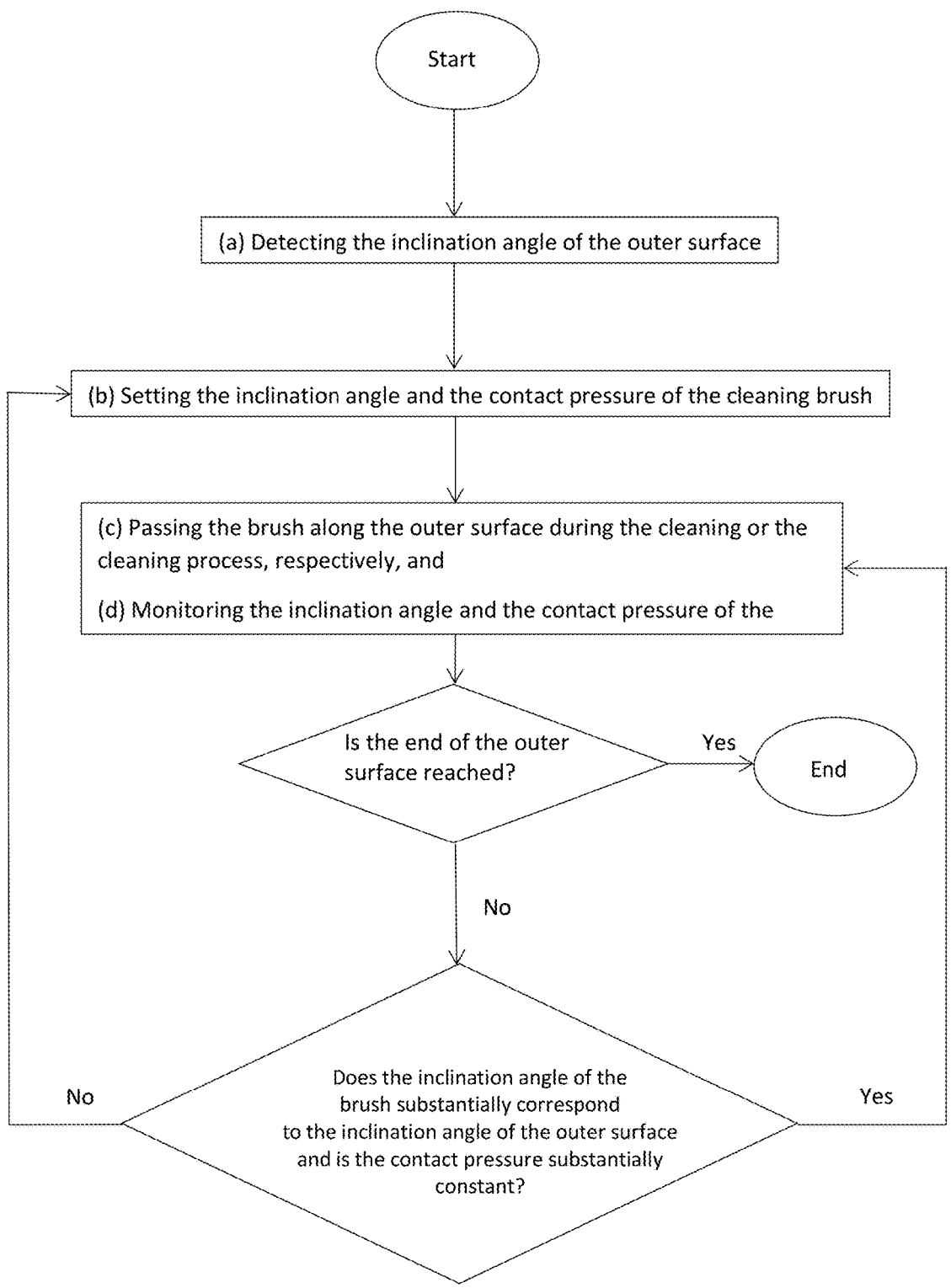
FIG. 6 shows a flowchart of the method according to a further exemplary embodiment of the disclosure.

In further exemplary embodiments, the cleaning brush can be applied to the outer surface with a contact pressure, and the apparatus can further include: a device for monitoring the contact pressure, and a device for regulating the contact pressure of the cleaning brush onto the outer surface, in particular for regulating the monitored contact pressure. In one exemplary embodiment of the method, step b) can include applying with a contact pressure to the outer surface, step d) can include monitoring of the contact pressure, and step e) can include regulating the contact pressure, in particular the monitored contact pressure, as shown in FIG. 6.

For example, in step d) the contact pressure can be indirectly detected, and thus monitored, by turning moment monitoring at the rotating brush, e.g., using a turning moment sensor, or by power monitoring of drives displacing or rotating the brushes, e.g., by the actual power consumption of the drive. In step e) it can be detected whether the contact pressure remains substantially constant. In so doing, the contact pressure can be judged to be substantially constant when it lies within a range of fluctuation with a lower limit value corresponding to the contact pressure on a planar vehicle surface and with an upper limit value corresponding to the contact pressure on an uneven vehicle surface and with an average desired penetration depth of the respective vehicle surface into the brush body. The uneven vehicle surface can include indentations and/or protrusions, e.g., wheel arches and/or a side mirror. In one exemplary embodiment, a desired range of the contact pressure, e.g., corresponding ranges of the turning moment and/or of the power, can be known from tests previously carried out and stored in the controller 22 (step a)), and in step e) retrieved and compared with the contact pressure detected in step d).

With these exemplary embodiments, the apparatus permits an abrupt and/or undesired change in the contact pressure of the brush to be detected and this to be counteracted by re-regulating the contact pressure and/or the inclination angle of the brush. For example, the contact pressure can be re-regulated in that the brush is pushed, while retaining the inclination angle, with its suspension element 18 on the cross-piece relative to the vehicle outer surface and/or the inclination angle of the brush is adjusted by the associated actuating drive of the suspension element 18. Alternatively or additionally, the power with which the actuating drive and/or rotary drive of the suspension element 18 is operated can be changed.

Thus, by an additional regulation of the contact pressure, the regulation of the inclination angle of the cleaning brush can be supported and optimized to achieve the desired cleaning result and to increase the operation safety of the apparatus. This can be advantageous, e.g., in the case of a sudden increase in the contact pressure owing to the brush coming too close to the vehicle outer surface. By the interaction of the two regulations, i.e., of the regulations of the inclination angle and of the contact pressure, the operation safety of the apparatus can be increased further. Thus, cleaning can be particularly thorough also in the transition region between two outer surfaces, e.g., from the side to the rear surface. As soon as the brush reaches the end of the outer surface to be cleaned and the associated corner to another outer surface, i.e., the transition region, as it is passing along the vehicle, the contact pressure of the brush is reduced because, at the corner, the penetration depth of the vehicle into the volume of the rotating brush body clearly decreases. In this way, as the brush is passing along the outer surface, it is possible to reliably detect when a corner of the outer surface to another outer surface, i.e., the transition region, is reached and the transition region can be thoroughly cleaned by re-regulation of the inclination angle and/or of the contact pressure of the brush.

In a further exemplary embodiment of the method, the height of the vehicle can be detected in step a) and from this an upper and lower limit value for the inclination angle of the side and/or rear surfaces can be derived. Then, in step e), a corresponding limit value regulation can be carried out.

In exemplary embodiments of the apparatus and of the method, the device for regulating the monitored inclination angle of the cleaning brush and the regulation of the monitored inclination angle of the cleaning brush in step e) of the method can be implemented in a known manner. The same is true for the device and for the method for monitoring and regulating the contact pressure of the cleaning brush on the outer surface. For example, standard regulations by P, PI, PD, or PID methods can be used. In the exemplary embodiments in which the contact pressure can additionally be regulated, e.g., multi-variable regulation can be implemented.

Furthermore, in exemplary embodiments of the apparatus or of the method, the device for regulating the monitored inclination angle of the cleaning brush or the regulation of the monitored inclination angle of the cleaning brush in step e) can be configured such that if an upper limit value of the inclination angle and/or of the contact pressure is exceeded, a safety stop of the apparatus or of the method is triggered. For example, this can be necessary when one or a plurality of the cleaning brushes swing excessively.

In particular, in exemplary embodiments of the method, the monitoring and/or regulation of the inclination angle of the cleaning brush(es) can take place throughout the cleaning process. Furthermore, the monitoring of the inclination angle of the cleaning brush(es) can take place independently of the detection of the inclination angle of the at least one outer surface. In an analogous manner in exemplary embodiments of the apparatus, the device for monitoring the inclination angle of the cleaning brush(es) can be configured to monitor the same throughout the cleaning process. The device for regulating the monitored inclination angle of the cleaning brush(es) can also be configured to regulate the same throughout the cleaning process. Furthermore, the device for monitoring the inclination angle of the cleaning brush can be configured and/or operate independently of the device for detecting the inclination angle of the at least one outer surface. In all exemplary embodiments, the monitoring can be carried out continuously or intermittently. In exemplary embodiments of the apparatus and of the method, the inclination angle of the at least one outer surface can be an inclination angle varying along one or a plurality of the outer surfaces, which is detected as such.

As shown by the exemplary embodiments described above, the apparatus and the method can be used for monitoring and regulation of the inclination angle, in some exemplary embodiments also for monitoring and regulation of the contact pressure, of the cleaning brush(es) during the cleaning process. Therefore, the apparatus permits guidance of the cleaning brush(es) along the outer surfaces, which is adapted to the entire outer contour of the vehicle, i.e., even at the transition region between two side surfaces, e.g., from the side surfaces to the rear surface, and to different and varying inclinations of the outer surfaces. This leads to particularly thorough cleaning of the vehicle. At the same time, it is possible using the apparatus to maintain an optimal and reliable penetration depth of the treated vehicle outer surface into the brush body or into the brush volume of the respective brush during the cleaning process. Furthermore, using the apparatus, undesired swinging or vibrating of the cleaning brush(es) can be avoided. Undesirable vibrations of the brush(es) which may still occur can also be sensed and a corresponding safety stop of the apparatus or of the method can be triggered. Therefore, the operation safety of the vehicle washing installation is increased and vehicle damages are avoided.

Finally, it is noted that the description of the disclosure and the exemplary embodiments are to be understood to be non-limiting with respect to a specific physical implementation of the disclosure. All features explained and illustrated in conjunction with individual exemplary embodiments of the disclosure can be provided in a different combination in the subject matter in accordance with the disclosure in order to achieve the advantageous effects thereof at the same time.

For a person skilled in the art, it is in particular obvious that the disclosure can be used not just for vehicle washing installations but also for other installations for cleaning objects, e.g., airplanes. Furthermore, the devices of the apparatus 10 can be distributed over a plurality of physical apparatuses.

LIST OF REFERENCE NUMBERS 10 apparatus for cleaning a vehicle having at least one outer surface
12 side surface
13 rear surface
14 device for detecting the inclination angle of the at least one outer surface
16 cleaning brush
18 device for setting an inclination angle of the cleaning brush with respect to the vertical corresponding to the inclination angle of the at least one outer surface
20 device for monitoring the inclination angle of the cleaning brush
22 controller

What is claimed is:

1. An apparatus for cleaning a vehicle having at least one outer surface which is inclined by an inclination angle with respect to a vertical, the apparatus comprising:
 a sensor configured to detect the inclination angle of the at least one outer surface;
 a cleaning brush which can be passed along the at least one outer surface;
 a suspension element configured to set the inclination angle of the cleaning brush with respect to the vertical corresponding to the inclination angle of the at least one outer surface;
 a device for monitoring the inclination angle of the cleaning brush during a cleaning process; and
 a controller configured to regulate the inclination angle of the cleaning brush during the cleaning process for adjusting to the inclination angle of the at least one outer surface,
 wherein the device for monitoring the inclination angle of the cleaning brush includes an angle sensor which includes a magnet and a magnetic field sensor,
 wherein the angle sensor is arranged at least partially on an inclination axis corresponding to the inclination angle of the cleaning brush, and the magnet is arranged on the inclination axis remote from the magnetic field sensor,
 wherein the angle sensor is formed such that during monitoring of the inclination angle of the cleaning brush a change in an orientation of a magnetic field of the magnet is detected, and
 wherein the controller is further configured to:
 determine a vibration of the cleaning brush, and
 trigger a safety stop upon a determination of an undesired vibration of the cleaning brush.

2. The apparatus as claimed in claim 1, wherein the inclination angle of the at least one outer surface with respect to the vertical is in a range of −20° to 90°.

3. The apparatus as claimed in claim 1, further comprising:
 a device for monitoring a contact pressure; and
 a device for regulating the contact pressure of the cleaning brush onto the at least one outer surface, wherein the cleaning brush can be applied to the at least one outer surface with the contact pressure.

4. A method for cleaning a vehicle having at least one outer surface which is inclined by an inclination angle with respect to a vertical, the method comprising:
 (a) detecting the inclination angle of the at least one outer surface;
 (b) setting the inclination angle of a cleaning brush with respect to the vertical corresponding to the inclination angle of the at least one outer surface;
 (c) passing the cleaning brush along the at least one outer surface during a cleaning process;
 (d) monitoring the inclination angle of the cleaning brush during step (c);
 (e) regulating the inclination angle of the cleaning brush during step (c) for adjusting to the inclination angle of the at least one outer surface;
 carrying out step (d) with an angle sensor which includes a magnet and a magnetic field sensor;
 arranging the angle sensor at least partially on an inclination axis corresponding to the inclination angle of the cleaning brush;
 arranging the magnet on the inclination axis remote from the magnetic field sensor;
 detecting, in step (d), a change in an orientation of a magnetic field of the magnet;
 determining a vibration of the cleaning brush; and
 triggering a safety stop upon a determination of an undesired vibration of the cleaning brush.

5. The method as claimed in claim 4, wherein the inclination angle of the at least one outer surface with respect to the vertical is in a range of −20° to 90°.

6. The method as claimed in claim 4, further comprising:
 cleaning at least one first outer surface and at least one second outer surface, the at least one first outer surface and the at least one second outer surface adjoining one another and being inclined by the same or a different inclination angle with respect to the vertical;
 detecting, in step (a), inclination angles of the at least one first outer surface and of the at least one second outer surface; and
 carrying out steps (b) to (e) for the at least one first outer surface, and subsequently carrying out steps (b) to (e) for the at least one second outer surface.

7. The method as claimed in claim 4, further comprising:
 applying the cleaning brush to the at least one outer surface with a contact pressure;
 monitoring the contact pressure; and regulating the contact pressure onto the at least one outer surface of the cleaning brush.

\* \* \* \* \*